US012593345B2

(12) United States Patent
Burdinat et al.

(10) Patent No.: US 12,593,345 B2
(45) Date of Patent: Mar. 31, 2026

(54) METHODS FOR AUTOMATICALLY CONFIGURING A BROADCAST NETWORK AND FEDERATING A PLURALITY OF CORRESPONDING BROADCAST NETWORKS, ENTITIES AND COMPUTER PROGRAM

(71) Applicant: ENENSYS TECHNOLOGIES, Cesson-Sevigne (FR)

(72) Inventors: Christophe Burdinat, Lyons (FR); Bartolo Scanavino, Menton (FR); Cédric Thienot, Paris (FR)

(73) Assignee: ENENSYS TECHNOLOGIES, Cesson-Sevigne (FR)

( * ) Notice: Subject to any disclaimer, the term of this patent is extended or adjusted under 35 U.S.C. 154(b) by 669 days.

(21) Appl. No.: 17/802,387

(22) PCT Filed: Feb. 23, 2021

(86) PCT No.: PCT/EP2021/054367
§ 371 (c)(1),
(2) Date: Aug. 25, 2022

(87) PCT Pub. No.: WO2021/170546
PCT Pub. Date: Sep. 2, 2021

(65) Prior Publication Data
US 2023/0146948 A1      May 11, 2023

(30) Foreign Application Priority Data
Feb. 27, 2020    (FR) ........................................ 2001976

(51) Int. Cl.
*H04W 72/00*       (2023.01)
*H04W 8/08*        (2009.01)
*H04W 72/30*       (2023.01)

(52) U.S. Cl.
CPC ............. *H04W 72/30* (2023.01); *H04W 8/08* (2013.01)

(58) Field of Classification Search
None
See application file for complete search history.

(56) References Cited

U.S. PATENT DOCUMENTS 10,027,496 B2      7/2018  Lemoine
11,368,498 B2 *    6/2022  LaJoie .................. H04L 65/612
(Continued)

FOREIGN PATENT DOCUMENTS

WO      WO-2015049432 A1 *   4/2015   ........... H04L 12/185

OTHER PUBLICATIONS

English translation of the Written Opinion of the International Searching Authority dated Mar. 11, 2021 for corresponding International Application No. PCT/EP2021/054367, filed Feb. 23, 2021.
(Continued)

*Primary Examiner* — Gerald A Smarth
(74) *Attorney, Agent, or Firm* — David D. Brush; Westman, Champlin & Koehler, P.A.

(57) ABSTRACT

A method for managing at least one communication network, including a first network including a mobility management entity. The method includes broadcasting, on a multicast IP address, an announcement message carrying an identifier of the mobility management entity; and receiving at least one attachment message from at least one entity for coordinating the broadcast in the first network or at least a second network of the at least one communication network, carrying an identifier of the broadcast coordination entity sending the attachment message.

17 Claims, 3 Drawing Sheets

(56) References Cited

U.S. PATENT DOCUMENTS

| | | | |
|---|---|---|---|
| 2013/0188547 A1* | 7/2013 | Moriwaki | ............. H04W 72/30 |
| | | | 370/312 |
| 2016/0226671 A1 | 8/2016 | Lemoine | |

OTHER PUBLICATIONS

Technical Specification, "LTE;Evolved Universal Terrestrial Radio Access Network (E-UTRAN); M3 Application Protocol (M3AP)", 3GPP ETSI TS 136 444 version 15.0.0 Release 15, Sep. 2018.

Technical Specification, "LTE; Evolved Universal Terrestrial Radio Access Network (E-UTRAN); M2 Application Protocol (M2AP)", 3GPP ETSI TS 136 443 version 15.0.0 Release 15, Sep. 2018.

Technical Specification, "3rd Generation Partnership Project; Technical Specification Group Radio Access Network; Introduction of the Multimedia Broadcast/Multicast Service (MBMS) in the Radio Access Network (RAN); Stage 2 (Release 15)", 3GPP TS 25.346 V15.0.0, Jun. 2018.

Technical Specification, "3rd Generation Partnership Project; Technical Specification Group Radio Access Network; MBMS synchronisation protocol (SYNC) (Release 15)", 3GPP TS 25.446 V15.0.0, Jul. 2018.

International Search Report dated Mar. 2, 2021 for corresponding International Application No. PCT/EP2021/054367, filed Feb. 23, 2021.

Written Opinion of the International Searching Authority dated Mar. 2, 2021 for corresponding International Application No. PCT/EP2021/054367, filed Feb. 23, 2021.

Alcatel-Lucent, "eMBMS Architecture: Alternatives for Allocation of MCE Function and Requirements on O&M",3GPP Draft; R3-071451 Allocation of MCE and Requirements on O&M, 3rd Generation Partnership Project (3GPP), Mobile Competence Centre ; 650, Route Des Lucioles ; F-06921 Sophia-Antipolis Cedex ; France, vol. RAN WG3, No. Athens, Greece; Aug. 15, 2007, Aug. 15, 2007 (Aug. 15, 2007), XP050162276.

"3rd Generation Partnership Project; Technical Specification Group Radio Access Network; Evolved Universal Terrestrial Radio Access Network (E-UTRAN); M3 Application Protocol (M3AP) (Release 15)", 3GPP Standard; Technical Specification; 3GPP TS 36.444, 3rd Generation Partnership Project (3GPP), Mobile Competence Centre ; 650, Route Des Lucioles ; F-06921 Sophia-Antipolis Cedex ; France, vol. RAN WG3, No. V15.0.0, Sep. 25, 2018 (Sep. 25, 2018), p. 1-66, XP051487365.

French Search Report and Written Opinion dated Aug. 31, 2020 for corresponding French Application No. 2001976, filed Feb. 27, 2020.

English machine translation of French Written Opinion dated Aug. 31, 2020 for corresponding French Application No. 2001976, filed Feb. 27, 2020.

* cited by examiner

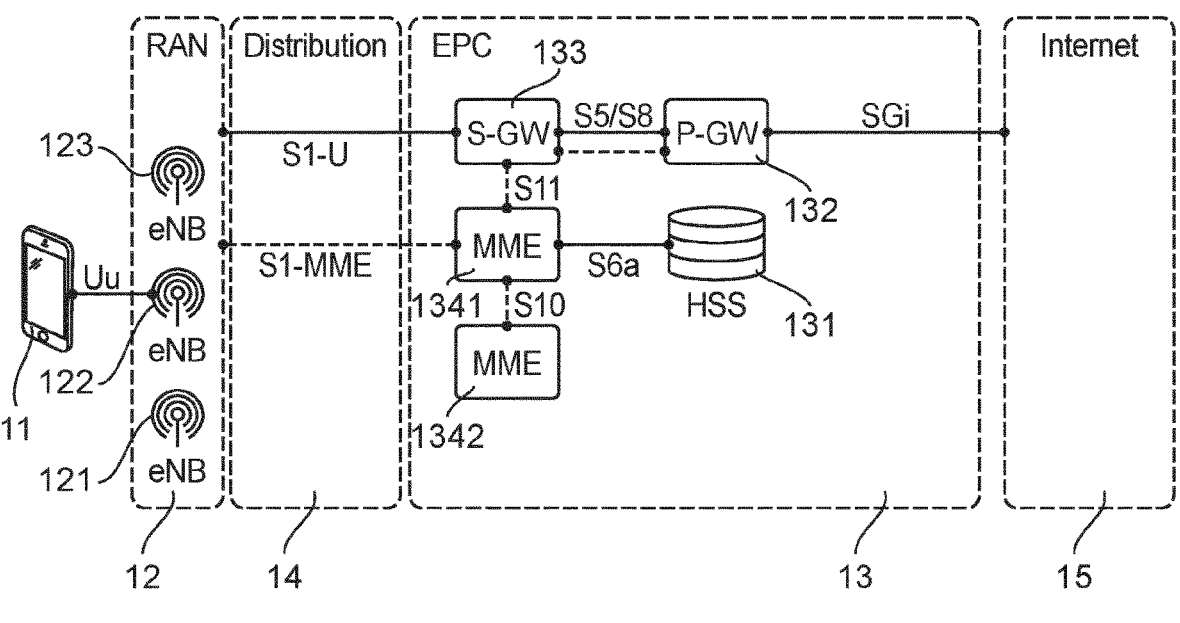
<u>Fig. 1</u>
<u>Fig. 2</u>

METHODS FOR AUTOMATICALLY CONFIGURING A BROADCAST NETWORK AND FEDERATING A PLURALITY OF CORRESPONDING BROADCAST NETWORKS, ENTITIES AND COMPUTER PROGRAM

CROSS-REFERENCE TO RELATED APPLICATIONS

This Application is a Section 371 National Stage Application of International Application No. PCT/EP2021/054367, filed Feb. 23, 2021, which is incorporated by reference in its entirety and published as WO 2021/170546 A1 on Sep. 2, 2021, not in English.

1. FIELD OF THE INVENTION

The field of the invention is that of communication networks, in particular cellular networks.

More specifically, the invention relates to the management of networks called "broadcast" networks, allowing to distribute the same content to a plurality of users.

In particular, the invention proposes a solution for the automatic discovery of such broadcast networks, allowing in particular to interconnect several networks with one another.

The invention finds in particular, but not exclusively, applications for the management of communication networks of the LTE ("Long-Term Evolution") type supporting broadcasting via MBMS ("Multimedia Broadcast Multicast Service"), commonly referred to as "LTE Broadcast", or of the 5G type, supporting point-to-multipoint broadcasting.

2. PRIOR ART

The operation of an LTE network for point-to-point communications and for broadcast communications is recalled below.

FIG. 1 illustrates an architecture example of an LTE network for point-to-point communications. According to FIG. 1, a terminal 11 communicates with at least one base station 121, 122, 123, denoted eNB or eNodeB. The base station(s) 121-123 belong to the radio part RAN 12 of the LTE network ("Radio Access Network"). For example, such a RAN network is of the E-UTRAN ("Evolved Universal Terrestrial Radio Access Network") type.

The base station(s) 121-123 communicate with various entities of the EPC network core 13 of the LTE network ("Evolved Packet Core") via a distribution network 14.

Conventionally, the network core EPC 13 comprises:
  a server 131, for example of the HSS ("Home Subscriber Server") type, storing pieces of information relating to network subscribers;
  a first gateway 132, for example of the P-GW ("Packet Data Network—Gateway") type, communicating with an external network 15, for example the Internet network;
  a second gateway 133, for example of the S-GW ("Serving Gateway") type, or router, transmitting to the first gateway 132 the data from the base station(s) 121-123;
  at least one mobility management entity 1341, 1342, for example of the MME ("Mobility Management Entity") type, controlling the terminal 11 by sending signaling messages taking into account pieces of information from the server 131.

It is recalled that the messages exchanged between the various entities forming an LTE network comprise, on the one hand, messages on the control plane, comprising the functions of resource allocation and signaling for the user terminals, and on the other hand messages on the user plane, comprising the transport of data.

At the control plane, the various mobility management entities 1341, 1342 communicate with one another via an interface S1 (for example S10). At least one mobility management entity 1341, 1342 communicates with the second gateway 133 via an interface S1 (for example S11) and with at least one of the base stations 121-123 via an interface S1 (for example S1-MME). The second gateway 133 communicates with the first gateway 132 via an interface S5 or S8.

At the user plane, the server 131 communicates with at least one mobility management entity 1341, 1342 via an interface S6a. The second gateway 133 communicates on the one hand with at least one of the base stations 121-123 via an interface S1 (for example S1-U) and on the other hand with the first gateway 132 via an interface S5 or S8. The first gateway 132 communicates with the external network via an interface SGi.

Thus, according to this architecture, if a user wishes to receive on his terminal 11 content broadcast by a video server connected to the Internet network 15, a "unicast" (point-to-point) connection is created between the video server and the terminal.

If several users wish to access the same content at the same time, for example during the retransmission of a particular event, such as a concert or a football match, a bearer is created between at least one of the base stations 121-123 and each terminal 11 wishing to receive this content. There are therefore as many "unicast" bearers as there are users wishing to simultaneously receive this content, which can cause an overload in terms of the bandwidth of the base stations 121-123.

In particular, to save bandwidth at the base stations, the LTE network can broadcast this content with MBMS.

FIG. 2 illustrates an example of LTE architecture for broadcasting via MBMS.

According to this example, new entities are provided in the network core EPC 13:
  a multicast gateway 235, for example of the MBMS-GW ("Multimedia Broadcast Multicast Service—Gateway") type;
  a broadcast management entity, for example a broadcast multicast service center 236 BM-SC ("Broadcast Multicast Service Center").

Such entities allow in particular to allocate radio resources and to generate the data streams to be broadcast. In particular, the broadcast management entity 236 can communicate with a content server 151, for example of the CDN type ("Content Delivery Network") belonging for example to the Internet network 15, or any other application server AS.

Moreover, new entities are provided in the radio access network 12. Such broadcast coordination entities 221, 222, 223, for example of the MCE ("Multi-Cell/Multicast Coordination Entity") type ensure access control and allocation of radio resources to the base station with which they are associated. For example, each broadcast coordination entity 221-223 is associated with a base station 121-123.

New interfaces are also defined for message exchanges.

Thus, at the control plane, the broadcast multicast service center 236 communicates with the multicast gateway 235 via an interface SGmb, the multicast gateway 235 communicates with at least one mobility management entity 1341, 1342 via an interface Sm, and said at least one mobility management entity 1341, 1342 communicates with at least one broadcast coordination entity 221-223 via an interface M3.

At the user plane, the broadcast multicast service center 236 communicates with the multicast gateway 235 through an interface SGimb, the multicast gateway 235 communicates with at least one base station 121-123 through an interface M1. According to the architecture of an LTE network for broadcasting via MBMS, it is noted that the downlink content streams on the user plane (that is to say passing through the interface SGlmb and the interface M1, illustrated in dotted lines in FIG. 2) are "multicast" type streams, that is to say point-to-multipoint.

If several users wish to access the same content at the same time, an MBMS bearer can be created between at least one of the base stations 221-223 and all the terminals wishing to receive this content. There is therefore a single MBMS bearer allowing all users to simultaneously receive the same content.

This broadcast mode is therefore of interest in particular when many users wish to receive the same content simultaneously, for example to follow an event in real time.

A disadvantage of such an architecture for broadcasting via MBMS is that the configuration of the different entities is tedious.

There is therefore a need to simplify the configuration of an LTE network supporting MBMS broadcasting, or more generally of a communication network supporting broadcasting.

3. DESCRIPTION OF THE INVENTION

The invention proposes a solution which does not have all the disadvantages of the prior art in the form of a method for managing at least one communication network, comprising a first communication network comprising a mobility management entity implementing:

broadcasting, on a multicast IP address, an announcement message carrying an identifier of said mobility management entity;

receiving at least one attachment message, from at least one broadcast coordination entity of said first network or from at least one second network, carrying an identifier of said broadcast coordination entity emitting the attachment message.

It is noted that according to the invention, such announcement and attachment messages are exchanged on the control plane.

According to the invention, it is thus proposed to use a mobility management entity of a first network, for example of the MME type if the context of an LTE type network for broadcasting via MBMS is considered, to broadcast on a multicast IP address an announcement message, allowing at least one broadcast coordination entity of the first network or of another network, for example of the MCE type if the context of an LTE type network is considered for broadcasting via MBMS, to be attached to the mobility management entity of the first network.

In this way, it is possible to automatically configure the mobility management entity of the first network, with the pieces of information from the broadcast coordination entities which respond to the announcement message, in particular their identifiers, and/or to automatically configure the coordination entity or entities that respond to the announcement message.

In particular, the mobility management entity of the first network can receive attachment messages from the broadcast coordination entity of the first network, or from another communication network.

The proposed solution can thus be used to interconnect, or federate, several communication networks.

It is noted that, according to one embodiment, the announcement message can be broadcast periodically and/or following a modification (for example an update) of the announcement message.

Moreover, according to one embodiment, the attachment message can be transmitted periodically and/or following a modification (for example an update) of the attachment message. According to another embodiment, the attachment message is transmitted only once from the same broadcast coordination entity to the same mobility management entity.

The invention also relates to a corresponding mobility management entity, comprising:

means for broadcasting, on a multicast IP address, an announcement message carrying an identifier of the mobility management entity;

means for receiving at least one attachment message, from at least one broadcast coordination entity of the first network or from at least one second network, carrying an identifier of the broadcast coordination entity emitting said attachment message.

Such a mobility management entity, for example of the MME type if the context of an LTE type network is considered for broadcasting via MBMS, is in particular adapted for implementing at least part of the management method described above. It may of course include the different features relating to the management method according to the invention, which may be combined or taken separately.

The invention moreover relates to a method for managing at least one communication network, comprising a first network comprising a broadcast coordination entity implementing:

receiving an announcement message broadcast, on a multicast IP address, for example of the IP type, by a mobility management entity of said first network or of at least one second network, said announcement message carrying an identifier of said mobility management entity;

transmitting to said mobility management entity at least one attachment message, carrying an identifier of said broadcast coordination entity.

Such a broadcast coordination entity can in particular receive announcement messages broadcast by different mobility management entities.

In other words, a broadcast coordination entity can be attached to a mobility management entity belonging to the same network as the broadcast coordination entity and/or be attached to a mobility management entity belonging to a separate network.

The invention also relates to a corresponding broadcast coordination entity, comprising:

means for receiving an announcement message broadcast, on a multicast IP address, by a mobility management entity of said first network or of at least one second network, said announcement message carrying an identifier of said mobility management entity;

means for transmitting to said mobility management entity at least one attachment message, carrying an identifier of said broadcast coordination entity.

Such a broadcast coordination entity, for example of the MCE type if the context of an LTE network is considered for broadcasting via MBMS, is in particular adapted for implementing at least part of the management method described above. It may of course include the different features relating to the management method according to the invention, which may be combined or taken separately.

The invention moreover relates to a method for managing at least one communication network, comprising a first network comprising a broadcast management entity implementing the reception of an announcement message broadcast, on a multicast IP address, by a mobility management entity of said first network or of at least one second network, said announcement message carrying an identifier of said mobility management entity.

In this way, it is possible to automatically configure the broadcast management entity of the first network, with the pieces of information carried by the announcement message from the mobility management entity.

The invention also relates to a corresponding broadcast management entity, comprising means for receiving an announcement message broadcast, on a multicast IP address, by a mobility management entity of said first network or of at least one second network, said announcement message carrying an identifier of said mobility management entity.

Such a broadcast management entity, for example of the BM-SC type if the context of an LTE network is considered for broadcasting via MBMS, is in particular adapted for implementing at least part of the management method described above. It may of course include the different features relating to the management method according to the invention, which may be combined or taken separately.

In particular, the different steps of the management method according to at least one embodiment of the invention can be implemented in various ways, in particular in hardware form and/or in software form.

For example, at least one step of the management method can be implemented:

on a reprogrammable calculation machine (a computer, a processor for example DSP ("Digital Signal Processor"), a microcontroller, etc.) executing a program comprising a sequence of instructions, on a dedicated calculation machine (for example a set of logic gates such as an FPGA ("Field Programmable Gate Array") or an ASIC ("Application-Specific Integrated Circuit"), or any other hardware module).

Consequently, an embodiment of the invention also aims at protecting one or more computer programs including instructions adapted to the implementation of at least part of a management method by a mobility management entity, a broadcast coordination entity, and/or a broadcast management entity, according to at least one embodiment of the invention as described above, when this or these programs are executed by a processor, as well as at least one computer-readable storage medium including instructions of at least one computer program as mentioned above.

4. LIST OF THE FIGURES

Other features and advantages of the invention will appear more clearly upon reading the following description of a particular embodiment, given by way of a simple illustrative and non-limiting example, and the appended drawings, among which:

FIG. 1, shown in relation to the prior art, illustrates an example of the architecture of an LTE network for unicast (point-to-point) communications;

FIG. 2, also shown in relation to the prior art, illustrates an example of the architecture of an LTE network for broadcasting via MBMS;

5. DESCRIPTION OF EMBODIMENTS OF THE INVENTION

5.1 General Principle

The invention is placed in the context of a communication network implementing several entities for the allocation of resources and signaling on the control plane, comprising in particular a broadcast coordination entity and a mobility management entity.

The general principle of the invention is based on the broadcasting, by the mobility management entity, on a multicast IP address, of at least its identifier. In particular, such a multicast IP address can be defined during network configuration. According to a particular embodiment, such an IP address can be configurable.

In this way, the mobility management entity can discover different entities of the communication network considered or other communication networks, and the broadcast coordination entity or entities of the communication network considered or other communication networks can be attached to the mobility management entity of the network considered.

In particular, it is thus possible to interconnect several communication networks, in order for example to be able to simultaneously broadcast pieces of information on a broadcast area common to these different networks, called federated broadcast area.

A broadcast area corresponds for example to a cell covered by a base station associated with a broadcast coordination entity, wherein content can be distributed. In particular, a broadcast area can be identified by an identifier.

In an LTE network for broadcasting via MBMS, a broadcast area is called "MBMS service area" and an identifier "MBMS SAI" ("MBMS Service Area Identifier").

For example, such networks may be private networks, in particular mobile networks, deployed by different service providers (for example law enforcement, firefighters, etc.). Thus, each communication network can be associated with a tactical bubble.

5.2 Description of an Embodiment

An example of implementation of the invention in an LTE-type communication network supporting MBMS broadcasting is described below, as illustrated for example in FIG. 2. Of course, the invention is not limited to this type of network, and applies in particular to 5G or other networks, supporting point-to-multipoint broadcasting. For example, in the case of a 5G network, the broadcast coordination entity can be of type gNodeB. In other words, the functionalities of the broadcast coordination entity can be integrated into a gNodeB. According to a particular embodiment, the proposed solution allows to interconnect networks of different types.

Figure 3:
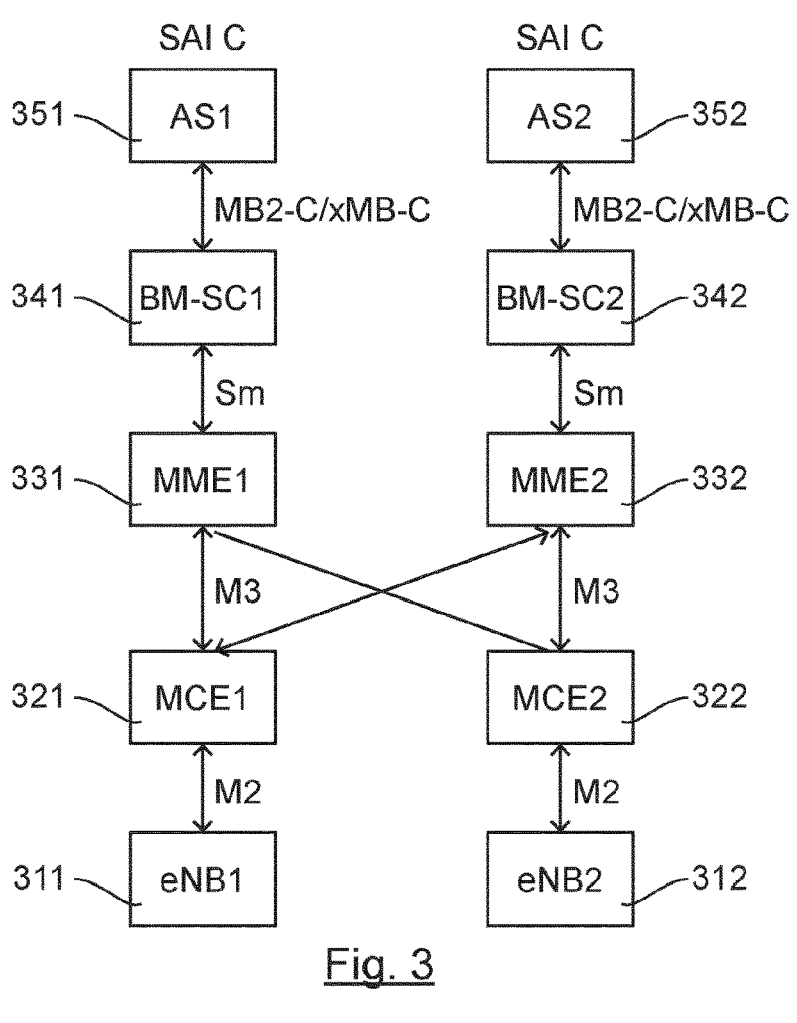
FIG. 3 illustrates two examples of radio-communication networks implementing the management method according to one embodiment of the invention.

As illustrated in FIG. 3, consider a first communication network comprising at least one base station eNB1 311, managed by a broadcast coordination entity MCE1 321. For example, the base station eNB1 311 can communicate with the entity MCE1 through an interface M2. The entity MCE1 can communicate with a mobility management entity MME1 331 via an interface M3. The entity MME1 331 can communicate with a broadcast management entity BM-SC1 341 via an interface Sm. The entity BM-SC1 341 can communicate with an application server AS1 351 via an interface MB2-C and/or an interface xMB-C.

According to a particular embodiment, an entity of the multicast gateway type (for example of the MBMS-GW type) can be provided between the entity MME1 331 and the entity BM-SC1 341, in particular if the functionalities associated with the multicast gateway are not implemented by the entity BM-SC1 341.

According to another embodiment, certain functionalities associated with these different entities (in particular MME, MBMS-GW, BM-SC1) can be implemented by the same entity.

Consideration is also given to at least one second communication network having a similar architecture, with at least one base station eNB2 312, one broadcast coordination entity MCE2 322, one mobility management entity MME2 332, one broadcast management entity BM-SC2 342, an application server AS2 352.

A) Configuration of Broadcast Coordination Entities (MCEs)

Figure 4:
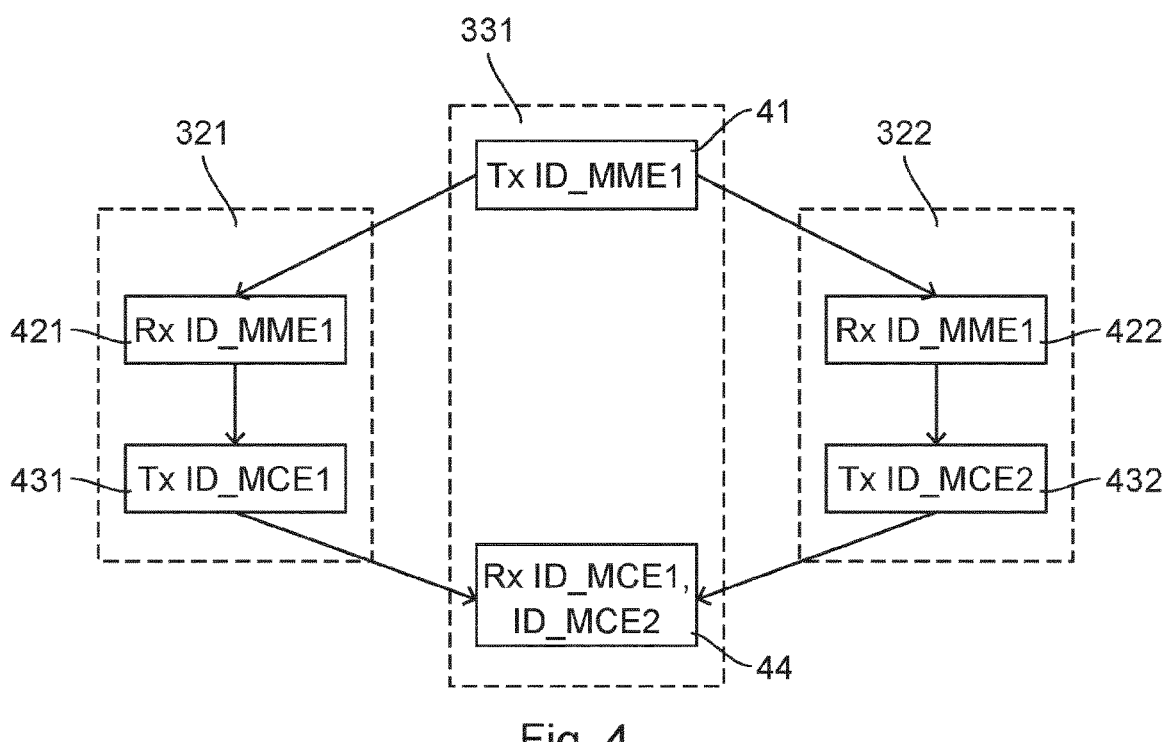
FIG. 4 illustrates the main steps of the management method.

FIG. 4 illustrates the main steps implemented by different entities of the first communication network, and possibly of at least one second communication network, according to FIG. 3.

In order to discover the entities of the communication network to which it belongs, a mobility management entity, for example the entity MME1 331, broadcasts 41 on a predefined multicast address an announcement message carrying its identifier. For example, such an announcement message is sent to a predefined IP address and port (for example to the address 239.1.1.1 and on the port 364444), and carries a unique identifier of the entity MME1 331 (ID_MME1), along with its IP address and available ports for the interface M3.

According to a particular embodiment, the announcement message can be secured before broadcasting, for example encrypted and/or signed.

The various entities of the communication networks, and in particular the entities MCE1 321 and MCE2 322 can receive the announcement message by listening to this predefined multicast address, and obtain the identifier of the entity MME1 331.

If an entity wishes to be attached to the mobility management entity emitting the announcement message, it can transmit an attachment message carrying its identifier.

The conventional procedure for attaching an entity MCE to an entity MME, also called the interface M3 configuration procedure, or "M3 set up procedure", is described in particular in the technical specification 3GPP TS 36.444 V15.0.0 (2018-09), paragraph 8.7.

For example, the entity MCE1 321 transmits 432 to the entity MME1 at least one attachment message carrying its identifier ID_MCE1. In the same way, the entity MCE2 322 can transmit 432 to the entity MME1 331 at least one attachment message carrying its identifier ID_MCE2. The entity MCE2 322 can also be attached to the entity MME2 332, conventionally or following the reception of an announcement message from the entity MME2 332.

More generally, a broadcast coordination entity can be attached to several mobility management entities, which may belong to distinct networks.

Thus, the mobility management entity emitting the announcement message implements the reception 44 of at least one attachment message, from at least one broadcast coordination entity of the first network and/or of at least one second network, carrying an identifier of the broadcast coordination entity emitting the attachment message.

The entities MCE1 321 and MCE2 322 thus discover the entities MME having emitted an announcement message, in particular the entity MME1 331, and can add them to their list of entities MME with which they are authorized to communicate. The interface M3 configuration procedure can then proceed.

It is noted that according to a particular embodiment, the identifier of the mobility management entity emitting the announcement message can be stored in a table managed by the broadcast coordination entity emitting the attachment message.

Similarly, the identifier of the broadcast coordination entity or entities emitting an attachment message can be stored in a table managed by the mobility management entity emitting the announcement message.

According to a particular embodiment, the broadcast coordination entity also transmits to said mobility management entity:

at least one piece of information representative of at least one broadcast area associated with this broadcast coordination entity and/or at least one list of at least one multicast bearer activated in at least one broadcast area associated with this broadcast coordination entity.

In an LTE network for broadcasting via MBMS, such a multicast bearer is also called MBMS support, or "MBMS bearer". For example, such a multicast bearer is a "logical" bearer.

It is noted that the "activation" of a multicast bearer in at least one broadcast area corresponds to the allocation of radio resources on this broadcast area and the configuration of the base stations/eNodeB associated with this broadcast area, to ensure sending multicast streams on these radio resources.

A broadcast coordination entity (for example the entity MCE1 321 and/or the entity MCE2 322) can thus send some pieces of information back to the mobility management entity or entities (for example the entity MME1) to which it is attached or wishes to be attached, so as to optimize the information broadcast.

According to a particular embodiment, the broadcast coordination entity updates the attachment message by adding:

the piece(s) of information representative of at least one broadcast area associated therewith, and/or the list(s) of at least one multicast bearer activated in at least one broadcast area associated therewith.

In other words, these pieces of information and/or lists can be transmitted in the attachment message. The attachment message is then considered to be "extended".

In another embodiment, these pieces of information and/or lists can be transmitted in another message, distinct from the attachment message.

When a new broadcast coordination entity is attached to a mobility management entity, the broadcast area(s) associated with this new broadcast coordination entity and/or the multicast bearers activated in the broadcast area(s) associated with this new broadcast coordination entity can be notified to the mobility management entity, and possibly recorded in a table.

As indicated above, according to this particular embodiment, the mobility management entity (for example the entity MME1) can therefore receive, from at least one broadcast coordination entity:

at least one piece of information representative of at least one broadcast area associated with said broadcast coordination entity or entities and/or at least one list of at least one multicast bearer activated in at least one broadcast area associated with said broadcast coordination entity or entities.

Such pieces of information can be stored in a table managed by the mobility management entity, preferably in relation to the identifier of the broadcast coordination entity or entities.

According to a particular embodiment, the mobility management entity updates the announcement message by adding:

the piece(s) of information representative of at least one broadcast area associated with the broadcast coordination entity or entities and/or the list(s) of at least one multicast bearer activated in at least one broadcast area associated with the broadcast coordination entity or entities.

These pieces of information and/or lists can thus be transmitted in the announcement message, which can in particular be received by other network entities, such as the broadcast management entity BM-SC1 341, or a multicast gateway. The announcement message is then considered to be "extended".

According to another embodiment, these pieces of information and/or lists can be transmitted in a message distinct from the announcement message.

In this way, the mobility management entity can have pieces of information on the broadcast area(s) associated with a broadcast coordination entity emitting an attachment message, that is to say the broadcast area(s) of a base station associated with such a broadcast coordination entity.

Similarly, the mobility management entity may have information on the multicast bearer(s) already activated on the broadcast area(s) associated with a broadcast coordination entity.

B) Configuration of Broadcast Management Entities (BM-SC) and Multicast Gateway (MBMS-GW)

A broadcast management entity, or other entities of the same network as that to which the mobility management entity emitting the message belongs or of another network, can also "listen" to the predefined multicast address on which the announcement message is broadcast.

Thus, a broadcast management entity (for example the entity BM-SC1 341 and/or the entity BM-SC2 342) can receive the announcement message broadcast by a mobility management entity of the first network or of at least one second network, and obtain the identifier of the mobility management entity emitting the announcement message.

In this way, it is possible to automatically configure the broadcast management entity, with the pieces of information carried by the announcement message from the mobility management entity.

In particular, according to an embodiment described above, the announcement message also carries:

at least one piece of information representative of at least one broadcast area associated with at least one broadcast coordination entity attached to said mobility management entity; and/or at least one list of at least one multicast bearer activated in at least one broadcast area associated with at least one broadcast coordination entity attached to said mobility management entity.

Thus, the broadcast management entity can identify broadcast areas specific to certain broadcast coordination entities, and broadcast areas common to several broadcast coordination entities.

This configuration, or knowledge of the broadcast areas at the broadcast management entity, can therefore be updated as new broadcast coordination entities are attached or released.

In particular, the broadcast area(s) can be configured in the mobility management entity or in any other entity upstream of the network (broadcast management entity, multicast gateway, application server for example) at the installation. The configuration of the mobility management entity can be updated upon receiving the attachment message from a broadcast coordination entity, and the configuration of other entities upstream of the network can be updated upon receiving the announcement message from the mobility management entity, after updating.

A broadcast management entity can also know the load of the broadcast coordination entities attached to the mobility management entity itself attached to the broadcast management entity. More specifically, according to a particular embodiment, the mobility management entity can transmit to the broadcast management entity of its network or of another network (or to other network entities, for example the multicast gateway or the application server) the list of multicast bearers activated per broadcast area. For example, the broadcast management entity BM-SC1 341 can know the load of the entities MCE1 321 and MCE2 322. Similarly, the broadcast management entity BM-SC2 342 can know the load of the entities MCE1 321 and MCE2 322.

These pieces of information can in particular be sent back from the broadcast coordination entities MCE1 321 and MCE2 322 to the mobility management entity MME1 331, for example in the attachment message or in another message, and from the mobility management entity MME1 331 to the broadcast management entity BM-SC1 341 (and possibly the broadcast management entity BM-SC2 342), for example in the announcement message or in another message.

In other words, the broadcast management entity can, according to a particular embodiment, know the list of multicast bearers activated per broadcast area, and the pieces of information related to these multicast bearers, for example:

identifier TMGI ("Temporary Mobile Group Identity"), quality of service QoS: Guaranteed Bit Rate GBR, Allocation and Retention Priority ARP, QoS Class Identifier QCI and/or start of multicast bearer and duration), etc.

These pieces of information can in particular be carried by the announcement message broadcast by the mobility management entity.

C) Federated Distribution

According to at least one embodiment of the invention, the reception of at least one attachment message from at least one broadcast coordination entity allows a mobility management entity to identify the specific broadcast areas to each broadcast coordination entity, and the broadcast areas common to several broadcast coordination entities, called federated broadcast areas.

For example, if the entity MCE1 321 is associated with three broadcast areas region A, region B and region C, and if the entity MCE2 322 is associated with two broadcast areas region C and region D, then region C is common to the two entities MCE1 321 and MCE2 322. The broadcast area corresponding to the region A for the entity MCE1 can be identified by the identifier SAI_1_A, the broadcast area corresponding to the region B for the entity MCE2 can be identified by the identifier SAI_1_B, the broadcast area corresponding to the region C for the entity MCE1 can be identified by the identifier SAI_1_C, the broadcast area corresponding to the region C for the entity MCE2 can be identified by the identifier SAI_2_C and the broadcast area corresponding to the region D for the entity MCE2 can be identified by the identifier SAI_2_D. The common broadcast area, called federated broadcast area, can be identified by a new identifier SAI_C.

In particular, the mobility management entity MME1 331 can receive a request for activation of at least one multicast bearer in at least one federated broadcast area, region C according to this example. This request comes for example from an application server and is relayed by a broadcast management entity. The activation request can in particular carry a field with the identifier SAI_C.

Upon receiving this activation request, the mobility management entity can identify the broadcast coordination entity or entities associated with the federated broadcast area, belonging to the first network and/or to at least one second network (for example the two entities MCE1 321 and MCE2 322 for the region C).

The mobility management entity can then transmit the activation request to the identified broadcast coordination entities.

According to this embodiment, it is thus possible, for a mobility management entity of a first network, to transmit broadcast instructions to broadcast coordination entities belonging to this first network and/or to at least another network, and therefore to broadcast pieces of information simultaneously in separate networks.

For example, when a multicast bearer is activated in the federated broadcast area (region C), the mobility management entity MME1 331 can allocate multicast resources to all the broadcast coordination entities associated with this broadcast area (for example the two entities MCE1 321 and MCE2 322). A mobility management entity, or an entity upstream in the network (for example a broadcast management entity or an application server) can thus activate a multicast bearer associated with broadcast coordination entities belonging to different networks using a federated broadcast area.

If a new broadcast coordination entity also associated with this federated broadcast area (region C) is attached to the mobility management entity MME1 331, and a multicast bearer is already activated in the federated broadcast area, then the mobility management entity MME1 331 can update the allocation of multicast resources, and request the new broadcast coordination entity to allocate resources for this multicast bearer.

The coverage of multicast bearers defined on a common broadcast area is therefore automatically extended when a new broadcast coordination entity is attached to the mobility management entity.

In other words, activated multicast bearers are not interrupted when attaching a new broadcast coordination entity, and can be propagated to the new broadcast coordination entity.

According to at least one embodiment of the invention, the broadcast management entity can first implement:

the reception of a request for activation of at least one multicast bearer in at least one federated broadcast area, for example from an application server, the verification of the availability of radio resources in said at least one federated broadcast area, taking into account the multicast bearer(s) activated in said federated broadcast area, obtained from said list, in the event of a positive verification, the transmission to said mobility management entity of said request for activation of at least one multicast bearer in said at least one federated broadcast area.

In particular, knowledge of the load of the broadcast coordination entities allows the broadcast management entity to implement a network capacity control before activating or updating a multicast bearer. For example, during the step of verifying the availability of radio resources, the broadcast management entity verifies whether the bit rate of the multicast bearer to be activated (new multicast bearer or updated multicast bearer) does not exceed a threshold configured for the broadcast area considered, so as to avoid congestion problems.

D) Verification of the Configuration of the Communication Networks

According to at least one embodiment, a step of verifying that the configuration of the networks allows interconnection, also called federation, is implemented prior to broadcasting in a federated area.

Thus, according to at least one embodiment, the mobility management entity (MME1) transmits to said at least one broadcast coordination entity (MCE1 or MCE2) configuration parameters of the network to which the mobility management entity belongs.

Such parameters are in particular intended for the synchronization of the base stations managed by said broadcasting coordination entities. For example, such configuration parameters comprise at least one element belonging to the group comprising:

MBSFN Area Id—MBSFN area identifier;
PDCCH Length—length of the PDCCH channel;
repetition Period;
repetition Period Extended;
offset;
modification Period;
modification Period Extended;
subframe Allocation Information;
Modulation and Coding Scheme;
cell Information List;
subcarrier Spacing MBMS;
etc;

as defined in particular in table 9.2.1.13 of the technical specification 3GPP TS 36.443, version V15.0.0.

In particular, such configuration parameters can be used to similarly configure the different communication networks, that is to say different entities forming a network (for example the mobility management entity, the broadcast coordination entity, and/or the broadcast management entity).

For their part, the broadcast coordination entity or entities attached to the mobility management entity implement(s):

obtaining configuration parameters for the network to which the mobility management entity belongs, verifying its compatibility with said configuration parameters.

These parameters can be transmitted by the mobility management entity or entities to which the broadcast coordination entity is attached in the announcement message or in another message.

For example, the entity MCE2 322, belonging to one second network, receives configuration parameters from the entity MME1 331, belonging to the first network, describing the configuration of the first network.

In particular, in the event of a positive verification (that is to say if the second network can be configured with the same parameters as the first network), the broadcast coordination entity of the second network is configured from said configuration parameters of the first network. Such a configuration allows for example a synchronized multicast broadcasting between the base stations, where the signals of the multicast bearers of each are positively added without destructive interference (MBSFN, "Multicast Broadcast Single Frequency Network") of the base stations managed by said broadcast coordination entity.

In the event of a negative verification, said broadcast coordination entity of the second network implements the transmission to said mobility management entity of the first network of a piece of information according to which said broadcast coordination entity cannot work in synchronized mode.

Thus, before launching the interface M3 configuration procedure, a broadcast coordination entity can verify whether the network configurations are compatible with a federation operation.

In particular, if the various communication networks are designed to broadcast multicast data on the same frequency (MBSFN), certain radio parameters must be aligned. For example, the identifiers of the federated broadcast area ("MBMS Service Area Identifier") must point to the same area MBSFN identifier in both networks.

If the identifiers of the federated broadcast area point to different MBSFN area identifiers, broadcasting in the two networks remains possible, but without synchronization between the two networks.

According to a particular embodiment, the packets provided by the broadcast management entity carry a synchronization header SYNC (as defined for example according to the specifications 3GPP TS 25.346 or GPP TS 25.446), with a position and a timestamp, allowing base stations to re-order packets before simultaneously transmitting them in MBSFN. The synchronization protocol parameters SYNC can also be aligned: SYNC period duration, SYNC sequence duration, origin.

According to another particular embodiment, the broadcast coordination entity can, upon receiving these configuration parameters, configure itself so as to allow MBSFN broadcast on a federated broadcast area.

As indicated above, these configuration parameters can be added to the announcement message broadcast by the mobility management entity, so that the broadcast coordination entities of the other networks can align themselves with the configuration parameters of the network to which the mobility management entity belongs.

In another embodiment, these configuration parameters are transmitted in another message sent by the mobility management entity.

In yet another embodiment, these configuration parameters are inserted into a message used in the interface M3 configuration procedure.

E) Variants

The implementation of the invention has been described above in at least one communication network for the automatic configuration of different entities belonging to the network, or of at least two communication networks for the federation of networks.

Of course, each network can be equipped with one or more entities of the same type (one or more broadcast coordination entities, one or more mobility management entities, etc).

Likewise, the federation can be extended to a greater number of networks.

According to a particular embodiment, the broadcasting management entity of each network implements a control of the capacity of the network before activating or updating a multicast bearer. Returning to the previous example, for a broadcast in the region C, the entity BM-SC1 341 and/or the entity the BM-SC2 342 can verify that the multicast bearer associated with the region C can be activated.

In particular, a communication network (that is to say at least one entity of the communication network) may not authorize the federation of communication networks, or leave a federation.

For example, an indicator is provided to indicate whether the "federation" mode is authorized or not.

Moreover, the implementation of the management method has been described at the entities for mobility management, broadcast coordination, and possibly broadcast management.

Of course, certain functionalities of the different entities can be virtualized or implemented at the "network edge", according to a technique of the "multi-access edge computing" type.

5.3 Devices

Figure 5:
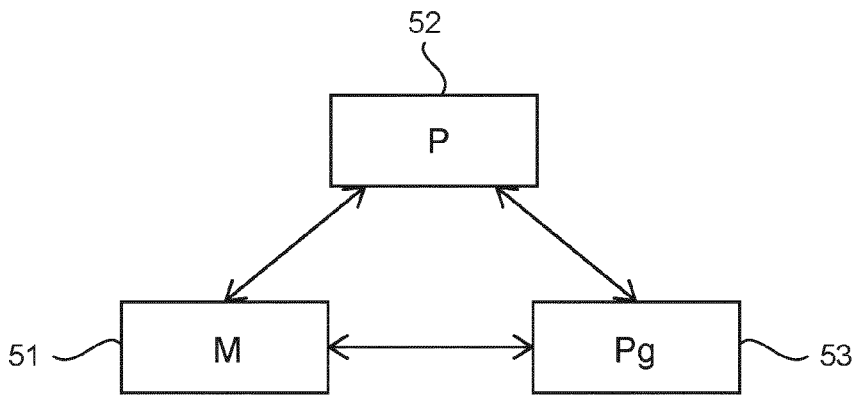
FIGS. 5 to 7 illustrate the simplified structure of a mobility management entity, a broadcast coordination entity and a broadcast management entity according to one embodiment of the invention.
Figure 6:
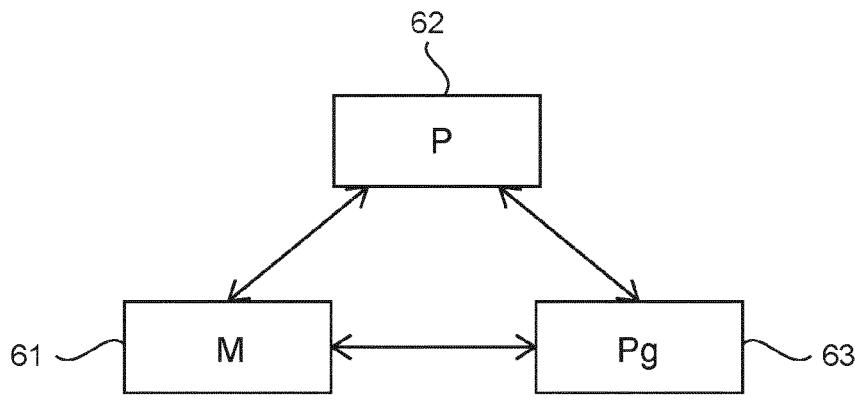
Figure 7:
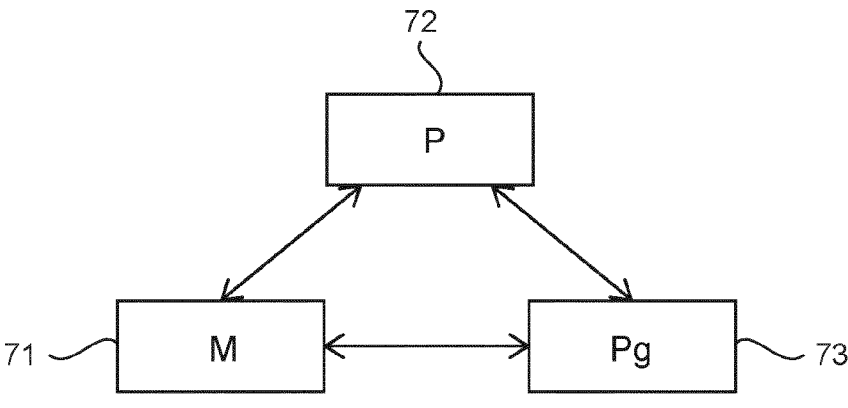

Finally, the simplified structures of a mobility management entity, of a broadcast coordination entity, and of a broadcast management entity according to at least one embodiment of the invention are presented in relation to FIGS. 5 to 7.

As illustrated in FIG. 5, a mobility management entity according to one embodiment of the invention comprises a memory 51 (comprising for example a buffer memory) and a processing unit 52 (equipped for example with at least one processor, FPGA, or DSP), controlled or pre-programmed by an application or a computer program 53 implementing at least part of the method for managing at least one communication network according to one embodiment of the invention (implemented by a mobility management entity).

Upon initialization, the code instructions of the computer program 53 are for example loaded into a RAM memory before being executed by the processing unit 52. The processing unit 52 implements at least some of the steps of the management method, according to the instructions of the computer program 53.

For this purpose, according to one embodiment, the processing unit 52 of the mobility management entity is configured to:

broadcast, on a multicast address, an announcement message carrying an identifier of said mobility management entity;

receive at least one attachment message, from at least one broadcast coordination entity, carrying an identifier of the broadcast coordination entity emitting the attachment message.

As illustrated in FIG. 6, a broadcast coordination entity according to one embodiment of the invention comprises a memory 61 (comprising for example a buffer memory) and a processing unit 62 (equipped for example with at least one processor, FPGA, or DSP), controlled or pre-programmed by an application or a computer program 63 implementing at least part of the method for managing at least one communication network according to one embodiment of the invention (implemented by a broadcast coordination entity).

Upon initialization, the code instructions of the computer program 63 are for example loaded into a RAM memory before being executed by the processing unit 62. The processing unit 62 implements at least some of the steps of the management method, according to the instructions of the computer program 63.

For this purpose, according to one embodiment, the processing unit 62 of the broadcast coordination entity is configured to:

receive an announcement message broadcast, on a multicast address, by a mobility management entity, said announcement message carrying an identifier of said mobility management entity;

transmit to said mobility management entity at least one attachment message, carrying an identifier of said broadcast coordination entity.

As illustrated in FIG. 7, a broadcast management entity according to one embodiment of the invention comprises a memory 71 (comprising for example a buffer memory) and a processing unit 72 (equipped for example with at least one processor, FPGA, or DSP), controlled or pre-programmed by an application or a computer program 73 implementing at least part of the method for managing at least one communication network according to one embodiment of the invention (implemented by a broadcast management entity).

Upon initialization, the code instructions of the computer program 73 are for example loaded into a RAM memory before being executed by the processing unit 72. The processing unit 72 implements at least some of the steps of the management method, according to the instructions of the computer program 73.

For this purpose, according to one embodiment, the processing unit 72 of the broadcast management entity is configured to:

receive an announcement message broadcast, on a multicast address, by a mobility management entity, said announcement message carrying an identifier of said mobility management entity.

Although the present disclosure has been described with reference to one or more examples, workers skilled in the art will recognize that changes may be made in form and detail without departing from the scope of the disclosure and/or the appended claims.

The invention claimed is:

1. A method for managing at least one communication network, comprising a first network comprising a mobility management entity of a network core of the first network, the method being implemented by the mobility management entity and comprising:

broadcasting, on a multicast IP address, an announcement message carrying an identifier of said mobility management entity; and receiving at least one attachment message, from at least one broadcast coordination entity of a radio access network of said first network or from at least one second network of said at least one communication network, carrying an identifier of the broadcast coordination entity emitting said attachment message.

2. The method according to claim 1, further comprising said mobility management entity receiving at least one of:

at least one piece of information representative of at least one broadcast area associated with said broadcast coordination entity or entities, or at least one list of at least one multicast bearer activated in at least one broadcast area associated with said at least one broadcast coordination entity.

3. The method according to claim 2, further comprising said mobility management entity updating said announcement message by adding at least one of said at least one piece of information or said at least one list.

4. The method according to claim 1, further comprising said mobility management entity:

receiving an activation request for activating at least one multicast bearer in at least one federated broadcast area, from a broadcast management entity of the network core of the first network, identifying the at least one broadcast coordination entity associated with said federated broadcast area, belonging to at least one of said first network or to said at least one second network, transmitting said activation request to said identified broadcast coordination entities.

5. The method according to claim 1, further comprising said mobility management entity transmitting to said at least one broadcast coordination entity configuration parameters of the at least one communication network to which said mobility management entity belongs.

6. The method according to claim 5, further comprising said mobility management entity broadcasting said configuration parameters in said announcement message.

7. The method according to claim 1, wherein said announcement message is broadcast periodically or following a modification of said announcement message.

8. A method for managing at least one communication network, comprising a first network comprising a broadcast coordination entity of a radio access network of the first network, the method being implemented by the broadcast coordination entity and comprising:

receiving an announcement message broadcast, on a multicast IP address, by a mobility management entity of a network core of said first network or of at least one second network of said at least one communication network, said announcement message carrying an identifier of said mobility management entity; and transmitting to said mobility management entity at least one attachment message, carrying an identifier of said broadcast coordination entity.

9. The method according to claim 8, further comprising said broadcast coordination entity transmitting to said mobility management entity at least one of:

at least one piece of information representative of at least one broadcast area associated with said broadcast coordination entity; or at least one list of at least one multicast bearer activated in at least one broadcast area associated with said broadcast coordination entity.

10. The method according to claim 9, further comprising said broadcast coordination entity updating said attachment message by adding at least one of said at least one piece of information or said at least one list.

11. The method according to claim 8, further comprising said broadcast coordination entity:

obtaining configuration parameters of the network to which said mobility management entity belongs, and verifying its compatibility with said configuration parameters.

12. The method according to claim 11, further comprising, in the event of a positive verification, configuring said broadcast coordination entity from said configuration parameters, and in that in the event of a negative verification, said broadcast coordination entity transmitting to said mobility management entity of a piece of information according to which said broadcast coordination entity cannot work in synchronized mode.

13. The method according to claim 8, wherein said attachment message is transmitted periodically or following a modification of said attachment message.

14. A method for managing at least one communication network, comprising a first network comprising a broadcast management entity of a network core of the first network, the method being implemented by the broadcast management entity and comprising:

receiving an announcement message broadcast, on a multicast IP address, by a mobility management entity of the network core of said first network or of at least one second network of said at least one communication network, said announcement message broadcast carrying an identifier of said mobility management entity.

15. The method according to claim 14, wherein said announcement message broadcast also carries at least one of:

at least one piece of information representative of at least one broadcast area associated with at least one broadcast coordination entity of a radio access network attached to said mobility management entity; or at least one list of at least one multicast bearer activated in at least one broadcast area associated with at least one broadcast coordination entity attached to said mobility management entity.

16. The method according to claim 15, further comprising said broadcast management entity:

receiving an activation request for activating at least one multicast bearer in at least one federated broadcast area, from an application server, verifying availability of radio resources in said at least one federated broadcast area, taking into account at least one multicast bearer activated in said federated broadcast area, obtained from said list, in the event of a positive verification, transmitting to said mobility management entity said request for activation of at least one multicast bearer in said at least one federated broadcast area.

17. A broadcast management entity of a network core of a first network of at least one communication network, wherein the broadcast management entity comprises:

a processor; and a non-transitory computer readable medium comprising instructions stored thereon which when executed by the processor configure the broadcast management entity to implement a method comprising:

receiving an announcement message broadcast, on a multicast IP address, by a mobility management entity of said first network or of at least one second network of said at least one communication network, said announcement message broadcast carrying an identifier of said mobility management entity.

* * * * *